US012565576B2

(12) United States Patent
Tian et al.

(10) Patent No.: US 12,565,576 B2
(45) Date of Patent: Mar. 3, 2026

(54) DEPROTEINIZED NATURAL RUBBER LATEX AND PREPARATION METHOD

(71) Applicant: Hunan Vontex New Material Technology Co., Ltd, Huaihua (CN)

(72) Inventors: Xiaohui Tian, Huaihua (CN); Dongqi Wang, Huaihua (CN); Xinyue Wang, Huaihua (CN); Huijun Zhang, Huaihua (CN); Yaqin Zhou, Huaihua (CN)

(73) Assignee: Hunan Vontex New Material Technology Co., Ltd, Huaihua (CN)

( * ) Notice: Subject to any disclaimer, the term of this patent is extended or adjusted under 35 U.S.C. 154(b) by 462 days.

(21) Appl. No.: 18/304,674

(22) Filed: Apr. 21, 2023

(65) Prior Publication Data

US 2024/0239999 A1 Jul. 18, 2024

(30) Foreign Application Priority Data

Jan. 16, 2023 (CN) .......................... 202310067485.5

(51) Int. Cl.
*C08L 7/02* (2006.01)
(52) U.S. Cl.
CPC ...................................... *C08L 7/02* (2013.01)
(58) Field of Classification Search
None
See application file for complete search history.

(56) References Cited

U.S. PATENT DOCUMENTS

| 6,380,283 B1 * | 4/2002 | Perrella | C08K 5/13 |
| | | | 524/157 |
| 2009/0192244 A1 * | 7/2009 | Doyle | C08C 1/04 |
| | | | 524/575.5 |
| 2022/0135707 A1 * | 5/2022 | Tian | C08C 1/04 |
| | | | 524/18 |

FOREIGN PATENT DOCUMENTS

| WO | WO-2021184703 A1 * | 9/2021 | C08L 7/02 |

* cited by examiner

*Primary Examiner* — Christopher M Rodd
(74) *Attorney, Agent, or Firm* — Wood Herron & Evans LLP

(57) ABSTRACT

A deproteinized natural rubber latex and preparation method thereof are provided. A combined immobilization technology of a multi-enzyme system is introduced to form a multi-enzyme synergistic effect, such that high-concentration enzymes contact with proteins in natural rubber latex. Meanwhile, due to the complexity and diversity of latex proteins, the catalytic properties of different enzymes are effectively combined to realize a multi-enzyme cascade reaction, and the proteins are hydrolyzed gradually and orderly. In addition, an immobilized enzyme filter screen is introduced, and the filter screen is lifted and circulated to make rubber particles collide with high-density enzyme carrier and then complete mixing evenly to reduce damages to the rubber particles when surface proteins are removed, thereby maintaining original physical properties of the latex. The rubber latex has high stability, reusability, is easy for separation and continuous operation, and is environmentally friendly.

8 Claims, 1 Drawing Sheet

DEPROTEINIZED NATURAL RUBBER LATEX AND PREPARATION METHOD

CROSS-REFERENCE TO RELATED APPLICATION

This patent application claims the benefit and priority of Chinese Patent Application No. 2023100674855, filed on Jan. 16, 2023, the disclosure of which is incorporated by reference herein in its entirety.

TECHNICAL FIELD

This application relates to rubber latex, and in particular to a deproteinized natural rubber latex and a preparation method thereof.

BACKGROUND

Natural rubber latex has favorable features that cannot be replaced by other materials, such as green and biological sources, excellent membrane strength, and high elasticity and memory. Therefore, it has become a preferable material for expandable elastic products such as medical appliances, catheters, tapes, tourniquets, gloves, and condoms. However, since natural rubber latex contains skin-sensitizing latex proteins, natural rubber latex products have the problem of allergic reactions caused by the proteins in the latex. Studies have found that among those who are frequently exposed to natural rubber latex and its products, the number of allergic patients has reached an epidemic level. These patients developed allergic reactions such as rhinitis, conjunctivitis, contact urticaria, and bronchial asthma when exposed to natural rubber latex products, which may even result in sudden death. Currently, an available route to circumvent allergy to proteins derived from natural rubber latex is to remove the proteins from the natural rubber latex. However, the performance of the natural rubber latex is degraded due to the removal of proteins, and this issue has not been resolved, which limits the application of deproteinized rubber products. The research on deproteinization of the natural rubber latex has continued for decades. Currently, there are many known methods for removing proteins from natural rubber latex. For example, Chinese Patent Application Publication Nos. CN102702393A, CN86106292A, CN1246485A, CN112010996A, CN102268106A, CN102002119A, CN105017446A, and CN1353116A directly or indirectly relate to methods for removing proteins by enzymolysis. However, all these methods rely on free proteases. These proteases are mixed in the product and difficult to separate, which also causes the pollution by the discharge of waste liquid containing residual enzymes. This also limits the dosage and type of enzymes and finally results in incomplete protein removal. Moreover, these proteases may also destroy the fluidity and viscosity of latex to varying degrees. This causes the obtained natural rubber latex products to be difficult to meet the requirements of dipping products such as gloves and condoms in terms of protein content and physical properties.

In addition to rubber hydrocarbons and water, natural rubber latex also contains about 5% of non-rubber substances, of which proteins account for 1% to 2% of the latex. Among these proteins, about 20% are distributed on the surface of rubber particles as an important material of the rubber particle protective layer, 65% are dissolved in the whey, and the rest are linked to latex at the bottom layer. Although having a low content in the whole latex system, these proteins show various categories and complex structures, which greatly impact the properties of natural rubber latex. At present, the methods for deproteinization of natural rubber latex mainly include: 1) surface treatment, also known as chlorination treatment, which is a method for reducing a water soluble protein content in rubber gloves by releasing chlorine; 2) leaching method, also known as rinsing method, which is a process of removing water soluble proteins in rubber products by rinsing, including dry film leaching and wet gel leaching; 3) adsorption replacement method, also known as substitution adsorption method, which includes steps of denaturing proteins by adding some small molecular substances, absorbing the proteins by adding an adsorbent, and then removing the proteins from the latex by centrifugal force during centrifugal concentration; 4) centrifugation method, which is to prepare latex with an extremely low content of non-rubber substances by repeatedly adding water to dilute the latex and conducting centrifugal concentration; 5) chemical destruction method, which is to treat the natural rubber latex using a strong acid or alkali, such that a colloidal state of the latex is destroyed, and this method can be used to prepare deproteinized solid rubber; 6) radiation method, which is to irradiate natural rubber latex using γ-rays or electron beams, which changes oil-soluble binding proteins in the latex into water soluble proteins, such that the water soluble proteins can be dissolved in a whey phase and then removed by centrifugation; 7) electrophoresis method, which can identify and separate the proteins due to unique isoelectric points and properties of each protein; 8) emulsion graft copolymerization technology, which is to prepare deproteinized natural rubber latex through emulsion copolymerization; and 9) enzymolysis method, which is to decompose proteins in the natural rubber latex using protease under alkaline conditions, transform the proteins into water soluble polypeptides or amino acids, and separate the water soluble polypeptides and amino acids from rubber particles by high-speed centrifugation, thus removing the proteins in the natural rubber latex.

Among the above methods, methods 1) and 2) are suitable for removing proteins from natural rubber products including gloves and are not suitable for the preparation of deproteinized natural rubber latex. By using the methods 3) to 9), natural rubber latex with low protein content can be prepared, but it is difficult to completely remove those complex and diverse proteins in the latex due to a single process. These methods (such as excessive centrifugation, radiation, chemical destruction, graft copolymerization, and enzymolysis) are helpful for protein removal, but may greatly damage the rubber particles and cause the latex to lose its original fluidity and viscosity which cannot be reversed even with emulsifiers. As a result, the product no longer has the film-forming properties, film strength, and high elasticity of natural rubber latex. When filtered, there may be a lot of flocs similar to bean curd residues, and resulting films are prone to develop cracks, flow marks, pinholes and have poor strength. Such a product cannot be used as latex raw material in the dipping film formation process of surgical gloves, condoms, protective films, and the like.

Thus, it would be desirable to provide deproteinized natural rubber latex and a preparation method and use thereof, with the deproteinized natural rubber latex having low protein content and excellent physical properties.

SUMMARY

To achieve these purposes, this application describes, in a first set of embodiments, a method for preparing deproteinized natural rubber latex, including the following steps:

compounding mesh gauze with an adsorption medium solution and conducting adsorption to obtain enzyme carrier gauze;

immersing the enzyme carrier gauze in solutions of different enzymes to conduct enzyme adsorption; conducting cross-linking immobilization on each treated gauze in a cross-linking agent solution to obtain mono-layer immobilized enzyme filter sheets corresponding to each of the different enzymes; and laminating the mono-layer immobilized enzyme filter sheets corresponding to each of the different enzymes to obtain an immobilized enzyme filter screen; where the different enzymes are selected from protease, peptidase, phospholipase, and lipase;

mixing natural rubber latex, water, and nonionic surfactant, adding a gluconolactone solution to a resulting mixture, and conducting recirculating filtration on a resulting mixed solution by lifting and dropping the immobilized enzyme filter screen until a pH value is 3 to 6 to obtain post-enzymolysis latex; and mixing the post-enzymolysis latex, a water-soluble polymer, and an anionic surfactant, adjusting a resulting mixture to a pH value of 9 to 11, conducting solubilization, and conducting centrifugal separation to obtain the deproteinized natural rubber latex.

Preferably, the mesh gauze is woven with one or more materials selected from the group consisting of silk braided wire, pure cotton braided wire, and pineapple fiber yarn, and the mesh gauze has a mesh pore size of 0.1 cm to 2.0 cm, a braided wire strength of greater than 25 MPa, and an elongation rate of less than 20%; the adsorption medium solution is one or more selected from the group consisting of a regenerated silk fibroin solution, a polyethyleneimine solution, a dopamine hydrochloride solution, a sodium alginate solution, and a chitosan solution; and the adsorption is conducted at 0° C. to 45° C. for 10 min to 300 min.

Preferably, the protease is one or more selected from the group consisting of alkaline protease, neutral protease, bromelain, papain, trypsin, thermolysin, staphylococcal protease, and clostripain; the peptidase is one or more selected from the group consisting of exopeptidase, aminopeptidase, and carboxypeptidase; and the phospholipase is one or more selected from the group consisting of phospholipase A, phospholipase B, phospholipase C, and phospholipase D.

Preferably, a cross-linking agent in the cross-linking agent solution is one or more selected from the group consisting of glutaraldehyde, glyoxal, terephthalaldehyde, and genipin; the cross-linking agent solution has a concentration of 0.05 wt % to 3.5 wt %, a pH value of 7.0 to 9.5, and a dosage of 3 g/g mesh gauze to 10 g/g mesh gauze; and the enzyme adsorption and the cross-linking immobilization each are conducted independently at 0° C. to 45° C. for 10 min to 300 min.

Preferably, the natural rubber latex has a dry rubber content of 1.0% to 65% by mass and a pH value of 8.0 to 12.0.

Preferably, the nonionic surfactant is any one or more selected from the group consisting of Tween, Span, trehalose, stachyose, glucoside, nonylphenol polyoxyethylene ether (NPE), iso-tridecanol polyoxyethylene ether, and alkyl polyglucoside, and the nonionic surfactant has a weight percent of 0.01% to 10% of the natural rubber latex; the gluconolactone solution has a concentration of 1 wt % to 10 wt %, and gluconolactone in the gluconolactone solution has a weight percent of 0.01% to 10% of the natural rubber latex.

Preferably, when the recirculating filtration is conducted, the immobilized enzyme filter screen is automatically lifted and dropped at a lifting speed of 1 cm/s to 20 cm/s for 3 h to 6 h when a vertical axis is fixed. After the recirculating filtration is completed, a filtrate is allowed to stand for 3 h or longer.

Preferably, the water soluble polymer is one or more selected from the group consisting of polyethylene glycol, methoxy polyethylene glycol, polypropylene glycol, methyl polypropylene glycol, polyethylene oxide, polyethylene oxide ether, polyvinyl alcohol, a polyvinyl alcohol copolymer, ethyl hydroxyethyl cellulose, methyl cellulose, polyacrylamide, a polyacrylamide copolymer, polyacrylic acid, sodium polyacrylate, polypropylene oxide, and polyglycerol-glycidyl ether-polyvinyl alcohol, and the water soluble polymer has a weight percent of 0.01% to 10% of the natural rubber latex; the anionic surfactant is one or more selected from the group consisting of diphenyl ether sulfonate, alkylbenzene sulfonate, alkylnaphthalene sulfonate, naphthalene sulfonate, alkyl sulfonate, dialkyl sulfosuccinate, α-alkene sulfonate, α-sulfonated fatty acid salt, alkyl sulfate, polyoxyalkylene stilbene phenol sulfate, polyoxyalkylene sulfonate, triphenylethylene phenol sulfate, polyoxyalkylene phenyl ether sulfate, alkyl sulfate, polyoxyalkylene alkyl sulfate, polyoxyalkylene alkylphenyl ether sulfate, polyoxyalkylene tristyrenated phenol sulfate, and polyoxyalkylene distyrenated phenol sulfate; the anionic surfactant has a weight percent of 0.01% to 10% of the dry rubber of the natural rubber latex; and the solubilization is conducted for 3 h to 6 h.

The various features described above can be combined in any combination and subcombination without departing from the scope of the present disclosure.

In a second set of embodiments, this application further provides deproteinized natural rubber latex prepared by the preparation method.

In a third set of embodiments, this application provides the use of the deproteinized natural rubber latex in a natural rubber latex product.

The embodiments described in this application provide a method preparing deproteinized natural rubber latex. In the present disclosure, a combined immobilization technology of a multi-enzyme system is introduced to produce a multi-enzyme synergistic effect, such that high-concentration enzymes contact with proteins in the natural rubber latex, which greatly improves catalytic efficiency of the enzymes. Meanwhile, due to the complexity and diversity of latex proteins, the catalytic properties of different enzymes are effectively combined to realize a multi-enzyme cascade reaction, and the proteins are hydrolyzed gradually and orderly. In addition, an immobilized enzyme filter screen is introduced, and the filter screen is lifted and circulated to make rubber particles collide with a high-density enzyme carrier and then complete mixing evenly to reduce damages to the rubber particles when surface proteins are removed, thereby maintaining original physical properties of the latex. Rubber latex has strong stability and reusability and is easy to separate and continuous operate, and environmentally friendly.

In the present disclosure, the deproteinized natural rubber latex prepared by the preparation method has a water-extracted protein content of less than or equal to 45 μg/g, and an antigenic protein content of less than or equal to 8 μg/g.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
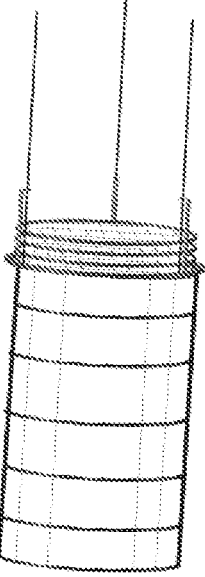
FIG. 1 shows a schematic diagram of a multi-layer net filtering device as described in conjunction with Example 4 of the Detailed Description below.

This application provides a method for preparing deproteinized natural rubber latex, including the following steps:

compounding mesh gauze with an adsorption medium solution, and conducting adsorption to obtain enzyme carrier gauze;

immersing the enzyme carrier gauze in solutions of different enzymes to conduct enzyme adsorption; conducting cross-linking immobilization on each treated gauze in a cross-linking agent solution to obtain mono-layer immobilized enzyme filter sheets corresponding to each of the different enzymes; and laminating the mono-layer immobilized enzyme filter sheets corresponding to each of the different enzymes to obtain an immobilized enzyme filter screen; where the different enzymes are selected from protease, peptidase, phospholipase, and lipase;

mixing natural rubber latex, water, and nonionic surfactant, adding a gluconolactone solution to a resulting mixture, and conducting recirculating filtration on a resulting mixed solution by lifting and dropping the immobilized enzyme filter screen until a pH value is 3 to 6 to obtain a post-enzymolysis latex; and mixing the post-enzymolysis latex, a water-soluble polymer, and an anionic surfactant, adjusting a resulting mixture to a pH value of 9 to 11, conducting solubilization, and conducting centrifugal separation to obtain the deproteinized natural rubber latex.

In the present disclosure, unless otherwise specified, the raw materials or reagents used all are commercially available products well known to those skilled in the art.

In the present disclosure, mesh gauze is compounded with an adsorption medium solution, and adsorption is conducted to obtain enzyme carrier gauze.

In the present disclosure, the mesh gauze is preferably woven with any one or more materials selected from the group consisting of silk braided wire, pure cotton braided wire, and pineapple fiber yarn, and the mesh gauze has a mesh pore size of preferably 0.1 cm to 2.0 cm, a braided wire strength of preferably greater than 25 MPa, and an elongation rate of preferably less than 20%. There is no special limitation on a weaving method, and the mesh gauze with the above conditions can be obtained according to well-known procedures.

The silk braided wire, pure cotton braided wire, and pineapple fiber yarn are natural fibers composed of proteins and polysaccharides and have the structural advantages of rich natural fibril layers. In particular, they exhibit unique affinity to protease, fibroin, polyethyleneimine, chitosan, dopamine hydrochloride, sodium alginate, and chitosan. After enzyme immobilization treatment, these materials remain soft and porous, have high mechanical strength and show excellent air permeability, water absorption and resistance, permeability, and capillary liquid absorption height.

In the present disclosure, the adsorption medium solution is preferably one or more selected from the group consisting of a regenerated fibroin solution, a polyethyleneimine solution, a dopamine hydrochloride solution, a sodium alginate solution, and a chitosan solution; when the adsorption medium solution are two or more of the above, there is no special limitation on the ratios between different types of the adsorption medium solutions, which can be adjusted according to actual needs.

In the present disclosure, the regenerated fibroin solution is preferably obtained by dissolving degummed silk with a $CaCl_2$/$CH_3CH_2OH$/$H_2O$ ternary solvent and then dialyzing with a semi-permeable membrane; the regenerated fibroin solution has a concentration of preferably 0.5 wt % to 5 wt %, more preferably 3.6 wt %, and a pH value of preferably 6 to 8, more preferably 7.0; and the pH value of the regenerated fibroin solution is preferably adjusted with phosphate buffered saline (PBS). There is no special limitation on the ratio between different solvents in the $CaCl_2$/$CH_3CH_2OH$/$H_2O$ ternary solvent, which can be adjusted according to actual needs. In an example, $CaCl_2$/$CH_3CH_2OH$/$H_2O$ is mixed at a mass ratio of 1:2:8 to obtain a ternary solvent, and degummed raw silk is put into the ternary solvent at a mass ratio of 1:20 (the raw silk:ternary solvent), allowed to stand at 50° C. for 6 h for swelling, and then stirred at 70° C. until the degummed raw silk is completely dissolved. A resulting solution is dialyzed through a semi-permeable membrane dialysis bag by pure water at room temperature, with the water changed once every 4 h, and conductivity of dialyzed water is detected until the conductivity is less than or equal to 1.0 μS/cm The dialyzed fibroin solution is concentrated in a 10 wt % polyethylene glycol solution to obtain a regenerated fibroin solution with a concentration of 3.6 wt % and a pH value of 7.0.

In the present disclosure, the polyethyleneimine solution has a concentration of preferably 1 wt % to 10 wt %, a pH value of preferably 8.0, and is prepared using an acetic acid-sodium hydroxide buffer with a pH value of 4 to 10. The dopamine hydrochloride solution has a concentration of preferably 1.0 mg/mL to 4.0 mg/mL and is prepared using a 0.05 M to 0.20 M (more preferably 0.1 M) Tris buffer solution with a pH value of 8.0 to 9.0. The sodium alginate solution has a concentration of preferably 0.1 wt % to 3.0 wt %, more preferably 0.11 wt %, a pH value of 7.0 and is prepared using a sodium phosphate buffer with a pH value of 4 to 6 The chitosan solution has a concentration of 0.1 wt % to 3.0 wt %, more preferably 0.21 wt %, a pH value of preferably 5.5 and is prepared using a sodium acetate buffer with a pH value of 4 to 6. There is no special limitation on a specific preparation process of the adsorption medium solution, and the above-required adsorption medium solution can be obtained according to well-known process in the art.

In the present disclosure, there is no special limitation on the dosage ratio of the mesh gauze to the adsorption medium solution, as long as the mesh gauze is fully immersed in the adsorption medium solution.

In the present disclosure, before the mesh gauze is compounded with the adsorption medium solution, the mesh gauze is preferably pretreated; the pretreatment preferably includes: putting the mesh gauze into a 70 wt % isopropanol solution, conducting ultrasonic cleaning for 40 min, and then ultrasonic cleaning with deionized water for 20 min to remove surface grease and dust, and drying in a vacuum oven at 50° C.

In the present disclosure, a process of compounding the mesh gauze with the adsorption medium solution is preferably infiltration or spraying, and the adsorption is conducted at preferably 0° C. to 45° C., more preferably 25° C. to 30° C. for preferably 10 min to 300 min, more preferably 120 min. The adsorption of the mesh gauze to the adsorption medium solution is completed through the adsorption.

In the present disclosure, after the adsorption is completed, obtained gauze is preferably washed with deionized water until the filtrate becomes colorless and transparent, and then dried in a vacuum oven at 50° C. overnight to obtain the enzyme carrier gauze.

In the present disclosure, in the adsorption medium solution, the regenerated fibroin, polyethyleneimine, chitosan, dopamine hydrochloride, sodium alginate, and chitosan each have desirable gel-forming properties and are easy to form membranes, porous microspheres or gels. These materials can be processed into various forms and can be used as immobilized enzyme carriers with excellent performance. For example, the regenerated fibroin transforms from a soluble structure into an insoluble p-fold structure while completing the immobilization of the enzyme, which is significantly different from that of other immobilized enzyme carriers. The chitosan and the polyethyleneimine each have a large number of amino groups on their molecular chain. At pH<10, most of the amino groups on the molecular chain are in a protonated state, which is a positively charged polyelectrolyte. However, due to the negative charge at pH<10, most enzymes have an electrostatic attraction to enzyme molecules at a certain pH, such that the enzyme molecules undergo ion adsorption and are immobilized. The dopamine hydrochloride may undergo oxidative self-polymerization in a weak alkaline solution containing oxygen to generate polydopamine with strong adhesion. The polydopamine can adhere to the surface of any solid substrate and form a strong and lasting bond, such that the filler has better adhesion, wettability, and surface roughness, which is more conducive to the operation of immobilizing enzymes. The sodium alginate has a G unit that is easy to interact with $Ca^{2+}$ in the molecular chain, and a hole is formed between the two G units of molecular chain and form an irreversible gel combined with a $Ca^{2+}$ "egg box" model, thereby immobilizing the enzyme in a gel network to form an immobilized enzyme.

In the present disclosure, the enzyme carrier gauze is immersed in solutions of different enzymes to conduct enzyme adsorption; cross-linking immobilization is conducted on each treated gauze in a cross-linking agent solution to obtain mono-layer immobilized enzyme filter sheets corresponding to each of the different enzymes; and the mono-layer immobilized enzyme filter sheets corresponding to each of the different enzymes are laminated to obtain an immobilized enzyme filter screen.

In the present disclosure, the different enzymes include protease, peptidase, phospholipase, and lipase; the protease is preferably one or more selected from the group consisting of alkaline protease, neutral protease, bromelain, papain, trypsin, thermolysin, staphylococcal protease, and clostripain; the peptidase is preferably one or more selected from the group consisting of exopeptidase, aminopeptidase, and carboxypeptidase; and the phospholipase is preferably one or more selected from the group consisting of phospholipase A, phospholipase B, phospholipase C, and phospholipase D. When the protease or peptidase includes two or more of the above, there is no special limitation on the ratio of different types of the protease or peptidase, which can be adjusted according to actual needs.

In the present invention, when the enzyme is the protease, the enzyme solution has a concentration of preferably 10 mg/mL to 60 mg/mL, more preferably 15.5 mg/mL to 16.5 mg/mL, and is added at 500 mg/g of mesh gauze to 1,500 mg/g of mesh gauze, more preferably 1,000 mg/g of mesh gauze, with a pH value of preferably 7.0 to 10.0, more preferably 9.0; when the enzyme is the peptidase, the enzyme solution has a concentration of preferably 10 mg/mL to 60 mg/mL, more preferably 12.9 mg/mL, and is added at 500 mg/g of mesh gauze to 1,500 mg/g of mesh gauze, more preferably 1,000 mg/g of mesh gauze, with a pH value of preferably 7.0 to 9.5, more preferably 7.5; when the enzyme is the phospholipase, the enzyme solution has a concentration of preferably 5 mg/mL to 30 mg/mL, more preferably 8.5 mg/mL, and is added at 200 mg/g of mesh gauze to 1,200 mg/g of mesh gauze, more preferably 1,000 mg/g of mesh gauze, with a pH value of preferably 7.0 to 9.5, more preferably 9.0; and when the enzyme is the lipase, the enzyme solution has a concentration of preferably 5 mg/mL to 30 mg/mL, more preferably 8.9 mg/mL, and is added at 200 mg/g of mesh gauze to 1,200 mg/g of mesh gauze, more preferably 1,000 mg/g of mesh gauze, with a pH value of preferably 5.0 to 9.0, more preferably 9.0.

In the present disclosure, the solvent used in the enzyme solution is preferably water; all other solutions used are aqueous solutions unless otherwise specified.

Natural rubber latex contains a variety of proteins, such as α-globulin adsorbed on the surface of rubber particles, as well as rubber protein, basic protein, and fibrous protein. Only in the whey there are contained at least 15 kinds of proteins. Rubber particles are spherical particles with a double-layer membrane-core structure. An inner core is composed of rubber hydrocarbons. Phospholipids are coated on the surface of the inner core to form a phospholipid layer, and proteins are coated on the surface of the phospholipid layer to form a protein layer. Phospholipids and proteins together constitute a double-layer outer membrane structure of the rubber particles. In the present disclosure, a compound enzyme is used to hydrolyze the proteins, that is, the compound enzyme (including protease, peptidase, phospholipase, and lipase) is used to conduct multi-level enzymolysis on phospholipids and proteins in the double-layer outer membrane, and the phospholipids and proteins are peeled off to become water soluble materials to be removed by centrifugation.

Different proteases act at different sites of a peptide chain, with the frequency of enzymatic cleavage being also different. Alkaline protease, neutral protease, bromelain, papain, trypsin, thermolysin, staphylococcal protease, and clostripain each have respective own exclusive peptide bond cleavage sites, showing high hydrolytic activities. In the present disclosure, different proteases can be used in combination to effectively hydrolyze various proteins in latex. However, this type of protease is an endopeptidase, which only cleaves the bonds inside the peptide chain and cannot cleave the bonds at the end of the peptide chain. The proteins thus enzymatically hydrolyzed still have a relatively high molecular weight (proteins and protein breakdown products with a number-average molecular weight $<M_n>$ of 4,500 or above), which are prone to induce allergies and have limited water solubility. The peptidase used in the present disclosure is an exopeptidase, which can cleave amino acids one by one from the N-terminal or C-terminal of the peptide chain to release free amino acids, thereby completely hydrolyzing the peptide chain of the protein into small-molecular amino acids. Lipase and phospholipase are introduced to break down fats and phospholipids adhering to proteins and stripped to minimize the interference of these oily substances on proteolysis.

In the present disclosure, a cross-linking agent in the cross-linking agent solution is preferably one or more selected from the group consisting of glutaraldehyde, glyoxal, terephthalaldehyde, and genipin; the cross-linking agent solution has a concentration of preferably 0.05 wt % to 3.5 wt %, more preferably 0.5 wt % to 3 wt %, a pH value of preferably 7.0 to 9.5, more preferably 7.5 to 9.0, and a dosage of preferably 3 g/g of mesh gauze to 10 g/g of mesh gauze, more preferably 5 g/g of mesh gauze; and a solvent used in the cross-linking agent solution is preferably water.

In the present disclosure, when the enzyme is the protease, the preparation method of the mono-layer immobilized enzyme filter sheet preferably includes: immersing the enzyme carrier gauze in the protease solution, vibrating on a constant-temperature shaker, conducting enzyme adsorption, such that protease is adsorbed on the enzyme carrier gauze; removing a supernatant, immersing the enzyme carrier gauze in the cross-linking agent solution, conducting cross-linking immobilization on an adsorption medium for adsorbing the protease, and washing with PBS until no protease is eluted; and freezing or drying at room temperature to obtain the mono-layer immobilized protease filter sheet. There is no special limitation on freezing or drying, which can be conducted according to the procedures well known in the art. There is no special limitation on the PBS, and commercially available products well known in the art will suffice.

In the present disclosure, when the enzymes include the peptidase, phospholipase, and lipase in sequence, the protease solution is replaced by the peptidase solution, phospholipase solution, and lipase solution in sequence; the above method is repeated to obtain a mono-layer immobilized peptidase filter sheet, a mono-layer immobilized phospholipase filter sheet, and a mono-layer immobilized lipase filter sheet.

In the present disclosure, the enzyme adsorption and the cross-linking immobilization each are conducted independently at preferably 0° C. to 45° C., more preferably 25° C. to 30° C. (room temperature) for preferably 10 min to 300 min, more preferably 120 min.

In the present disclosure, the lamination of the mono-layer immobilized enzyme filter sheets corresponding to the different enzymes preferably includes: laminating one or a combination of more selected from the group consisting of a mono-layer immobilized protease filter sheet, a mono-layer immobilized peptidase filter sheet, a mono-layer immobilized phospholipase filter sheet, and a mono-layer immobilized lipase filter sheet to form a multi-layer immobilized enzyme filter screen with a layer spacing of preferably 2 cm to 50 cm, more preferably 5 cm. Each mono-layer immobilized enzyme filter sheet (the mono-layer immobilized protease filter sheet, the mono-layer immobilized peptidase filter sheet, the mono-layer immobilized phospholipase filter sheet, and the mono-layer immobilized lipase filter sheet) is laminated by at least one layer.

In the present disclosure, in the immobilized enzyme filter screen, the loading capacity of the immobilized enzyme is preferably 93 mg/g screen to 375 mg/g screen.

In the present disclosure, a natural rubber latex, water, and nonionic surfactant are mixed, a gluconolactone solution is added to a resulting mixture, and recirculating filtration is conducted on a resulting mixed solution by lifting the immobilized enzyme filter screen until a pH value is 3 to 6 (preferably 5.0) to obtain a post-enzymolysis latex.

In the present disclosure, the natural rubber latex is preferably fresh latex of *Hevea brasiliensis*, concentrated latex or skim latex thereof; and the natural rubber latex has a dry rubber content of preferably 1.0% to 65%, more preferably 25% to 60%, and a pH value of preferably 8.0 to 12.0.

In the present disclosure, preferably the steel bars are hooped to form a steel ring as a frame to fix the filter screen; each filter screen is fixed with three vertical axes that are equally divided (the angle between the lines is 120°), forming a multi-layer filter screen with different layer spacing; and the filter screen is placed in a cylinder, and then automatically lifted by a mechanical device.

In the present disclosure, a process of mixing a natural rubber latex, water, and a nonionic surfactant, and adding a gluconolactone solution to a resulting mixture preferably includes: putting the natural rubber latex into a cylindrical (with height/inner diameter=100 cm/40 cm) container, adding water such that the latex has a concentration of less than or equal to 30 wt %, adding the nonionic surfactant; starting the automatic lifting and dropping of the filter screen at a lifting speed of 10 cm/s for 4 h, and then allowing to stand for 8 h; starting the automatic lifting of the filter screen at a lifting or dropping speed of 10 cm/s for 1 h, and slowly adding the gluconolactone solution dropwise.

In the present disclosure, the nonionic surfactant is preferably one or more selected from the group consisting of Tween, Span, trehalose, stachyose, glucoside, nonylphenol polyoxyethylene ether (NPE, OP-10), iso-tridecanol polyoxyethylene ether, and alkyl polyglucoside, and the nonionic surfactant has a weigh percent preferably 0.01% to 10%, more preferably 5% of the natural rubber latex; and when the nonionic surfactant includes two or more of the above, there is no special limitation on the ratio of different types of the nonionic surfactants, which can be adjusted according to actual needs.

In the present disclosure, the gluconolactone solution has a concentration of preferably 1 wt % to 10 wt %, more preferably 6 wt %; a solvent of the gluconolactone solution is preferably water; and in the gluconolactone solution, gluconolactone has a weight percent preferably 0.01% to 10%, more preferably 5% of the natural rubber latex. The gluconolactone solution is preferably added dropwise at 133 g/min; when adding the gluconolactone dropwise, the lifting-dropping filtration is started to realize stirring, such that the gluconolactone is rapidly dispersed, thus avoiding gel flocculation caused by high micro-environment concentration.

In the present disclosure, the shape and the size of the immobilized enzyme filter screen are preferably consistent with an inner cavity of the container containing the natural rubber latex, such that it can be automatically lifted and dropped when the vertical axis is fixed.

In the present disclosure, after the gluconolactone solution is added dropwise, the immobilized enzyme filter screen is preferably started to circulate, filter, and stir for 3 h to 6 h, such that the pH value of the latex system decreases slowly, and the pH value gradually changes from 10 to 3-6; the pH value is stabilized at 3-6, more preferably 5. The pH value is stabilized by controlling the dosage of gluconolactone solution, because the hydrolysis of gluconolactone causes the pH value of the solution to drop, with a degree of decline depending on the amount of gluconolactone used. When the recirculating filtration is conducted, the immobilized enzyme filter screen is automatically lifted and dropped at a lifting speed of preferably 1 cm/s to 20 cm/s, more preferably 10 cm/s for preferably 3 h to 6 h when the vertical axis is fixed.

During the recirculating filtration, the natural rubber latex and the immobilized enzymes are fully reacted by the recirculating filtration to decompose the proteins and phospholipids in the latex; protected with a nonionic surfactant, the natural rubber latex is slowly acidified by hydrolysis of the gluconolactone, changing the hydrophilicity and hydrophobicity of the enzymatically hydrolyzed proteins and phospholipids, causing them lose their role as a protective layer of rubber particles and detach from the surface of rubber particles. Instead, the nonionic surfactant is adsorbed on the surface of the rubber particles.

In the present disclosure, the immobilized enzyme filter screen has multiple functions, including stirring, enhancing the contact between rubber particles and enzymes, preventing free enzyme residue in the latex, and reusing the immobilized enzymes. The more filter layers the immobilized enzyme filter screen contains, the more fully the protein is decomposed; or the longer the recirculating filtration time, the more fully the protein is decomposed.

In the present disclosure, after the recirculating filtration is completed, the obtained latex is preferably allowed to stand, and the immobilized enzyme filter screen is taken out, washed with water, frozen or dried at room temperature, and reused; the standing is conducted for preferably greater than or equal to 3 h.

In the present disclosure, the post-enzymolysis latex, a water-soluble polymer, and an anionic surfactant are mixed, an obtained mixture is adjusted to a pH value of 9 to 11, solubilization is conducted, and centrifugal separation is conducted to obtain the deproteinized natural rubber latex.

In the present disclosure, the water soluble polymer is preferably one or more selected from the group consisting of polyethylene glycol, methoxy polyethylene glycol, polypropylene glycol, methyl polypropylene glycol, polyethylene oxide, polyethylene oxide ether, polyvinyl alcohol, a polyvinyl alcohol copolymer, ethyl hydroxyethyl cellulose, methyl cellulose, polyacrylamide, a polyacrylamide copolymer, polyacrylic acid, sodium polyacrylate, polypropylene oxide, and polyglycerol-glycidyl ether-polyvinyl alcohol. When the types of the water-soluble polymer are two or more of the above materials, there is no special limitation on the ratio of different types of the water-soluble polymer, which can be adjusted according to actual needs.

In the present disclosure, the water-soluble polymer has a weight percent preferably 0.01% to 10%, more preferably 3% of the natural rubber latex.

In the present disclosure, the anionic surfactant is preferably one or more selected from the group consisting of diphenyl ether sulfonate, alkylbenzene sulfonate, alkylnaphthalene sulfonate, naphthalene sulfonate, alkyl sulfonate, dialkyl sulfosuccinate, α-alkene sulfonate, α-sulfonated fatty acid salt, alkyl sulfate, polyoxyalkylene stilbene phenol sulfate, polyoxyalkylene sulfonate, triphenylethylene phenol sulfate, polyoxyalkylene phenyl ether sulfate, alkyl sulfate, polyoxyalkylene alkyl sulfate, polyoxyalkylene alkylphenyl ether sulfate, polyoxyalkylene tristyrenated phenol sulfate, and polyoxyalkylene distyrenated phenol sulfate; when the types of the anionic surfactant are two or more of the above, there is no special limitation on the ratio of different types of the anionic surfactant, which can be adjusted according to actual needs.

In the present disclosure, the anionic surfactant has a mass preferably 0.01% to 10%, more preferably 3% of the dry rubber of the natural rubber latex.

In the present disclosure, the anionic surfactant and water soluble polymer are used to restore or even enhance the water solubility of protein- and phospholipid-decomposed products, and make them enter the water phase; meanwhile, increasing the difference in specific gravity between skim serum and latex facilitates subsequent centrifugation to remove most of the non-rubber components including protein and phospholipids to obtain the deproteinized natural rubber latex.

In the present disclosure, there is no special limitation on the mixing process of the post-enzymolysis latex, the water-soluble polymer, and the anionic surfactant, as long as the materials are uniformly mixed according to the process well known in the art.

In the present disclosure, preferably the pH value is adjusted to 9 to 11 (more preferably 10) using a KOH solution, solubilization is conducted under stirring, and a solubilized product is allowed to stand for not less than 5 h. The resulting product is subjected to centrifugal separation to obtain the deproteinized natural rubber latex. The solubilization is conducted for preferably 3 h to 6 h. There is no special limitation on the rotational speed of the stirring and the centrifugal separation, which can be conducted according to the procedures well known in the art. There is no special limitation on the concentration of the KOH solution, which can be adjusted according to actual needs.

In the present disclosure, after the deproteinized natural rubber latex (having a purity of not less than 99%, by dry rubber content/total solid content) is obtained by centrifugation, the preparation method preferably further includes: diluting the deproteinized natural rubber latex to below 30% with deionized water, concentrating by centrifugation, repeating the dilution and centrifugation in sequence. Through the effect of different immobilized enzyme filter screens, the natural rubber latex has a water extraction protein content of less than or equal to 45 μg/g (as per test standard ASTM D 5712), and an antigenic protein content of less than or equal to 8 μg/g (as per test standard ASTM D 6499).

In the present disclosure, the protease, peptidase, phospholipase, and lipase are immobilized on the mesh gauze with a filtering function to make the immobilized enzyme filter screen; the natural rubber latex and the immobilized enzymes can fully interact with the natural rubber latex by recirculating filtration to decompose the proteins and phospholipids in the latex; the natural rubber latex is protected with the nonionic surfactant, slowly acidified by gluconolactone hydrolysis, such that the hydrophilicity and hydrophobicity of enzymatically-hydrolyzed proteins and phospholipids are changed, losing their roles as a protective layer, and are detached from the surface of rubber particles. Instead, the nonionic surfactant is adsorbed on the surface of the colloidal particles, the obtained latex is adjusted to be alkaline, and anionic surfactant and water-soluble polymer are added to restore or even enhance the water solubility of protein- and phospholipid-decomposed products, and the decomposed products are removed by centrifugation to obtain the deproteinized natural latex.

Fresh natural rubber latex has a protein content of 1% to 2% of the natural rubber latex, of which about 20% of the protein is distributed on the surface of rubber particles, 65% is dissolved in the whey, and the remaining protein is attached to the bottom part of the natural rubber latex. Rubber particles generally have a three-layer structure, where the innermost layer is a sol layer composed of rubber hydrocarbon molecules with a small degree of polymerization, and the middle layer is a gel layer composed of rubber hydrocarbon molecules with a high degree of polymerization and may have a branched or cross-linked structure. Proteins and phospholipids are bonded to the ends of rubber hydrocarbon molecules, and further bonded to or associated with higher-level branched structures. The outermost layer is a protective layer formed by proteins and lipids, playing a role in maintaining the dispersion and stability of rubber particles. There are many polar groups in the protein and lipid molecules in the protective layer, and there are also many elements with strong electronegativity, and the water molecules in the whey are polar molecules too. Accordingly, the surface of rubber particles can be hydrated through the action of permanent dipole attraction and hydrogen bond and a hydration film can be formed on the surface of rubber particles. This hydration film is sensitive to pH and is stable under alkaline conditions, but easily destroyed under acidic conditions. In the present disclosure, the protease, peptidase, phospholipase, and lipase have a synergistic effect to effectively decompose proteins and lipids in different structural levels of natural rubber latex. While reducing the degree of branching of rubber molecules, the proteins and lipids are more likely to detach from the surface of the micelles to release water soluble protein- and phospholipid-decomposed products. In particular, various enzymes are immobilized on the mesh gauze with a filtering function, which has better stability, high activity, and operability than those of free enzymes, and can be reused. In addition, the use efficiency of the enzyme is improved to greatly reduce the dosage, such that immobilized enzymes do not remain in the latex. The recirculating filtration of the mesh gauze greatly increases the contact probability between the rubber particles and the enzymes and improves the reaction efficiency from both chemical and physical perspectives.

Most of the protein and phospholipid products decomposed by immobilized enzymes are still adsorbed on the surface of the micelles and have negative charges, which are sensitive to pH. In the present disclosure, gluconolactone and the nonionic surfactant are added to the natural rubber latex. Gluconolactone is mildly hydrolyzed, releasing hydrogen ions uniformly and slowly to gradually lower the pH value, such that the speed at which nonionic surfactant is adsorbed to the surface of micelles is greater than the speed at which protein- and phospholipid-decomposed products are acidified. This realizes that the nonionic surfactant replaces the proteins and lipids as a protective layer, preventing the dispersion stability of the rubber particles from being damaged. It solves the problem encountered in the alkali-acid inversion of latex. In contrast, in the general alkali-acid inversion, the acid solution is added dropwise to the alkaline latex, and it is too short a time for the acid solution to diffuse at the moment of adding dropwise, leading to a microenvironment with excessively high acid concentration. In this microenvironment, the rubber particles are easily demulsified, causing local coagulation of the rubber particles. This damage is irreversible, may ultimately affect the film-forming strength of the latex, and even cause film-forming defects.

In all the existing enzymolysis methods free protease is used, and a portion of the protease eventually remains in the product, and a portion of the protease is discharged to pollute the environment. As a result, the amount and the type of enzymes will be limited, resulting in low enzymolysis efficiency, incomplete protein removal, complex operation, difficult control, and difficulty in industrial production. In the present disclosure, an immobilized enzyme is used, which is an enzyme that can be immobilized on a carrier and can catalyze a reaction within a certain space range.

Enzyme-catalyzed reactions are mostly conducted in an aqueous solution, but immobilized enzymes treat the free enzymes by physical or chemical methods to make them insoluble in water but still have enzyme activity. Compared with the free enzymes, the immobilized enzymes have more stable enzyme performances and are less affected by external factors such as temperature, organic solvents, and pH. In particular, the immobilized enzymes are easy to separate from the reaction system and can be operated continuously. Therefore, the immobilized enzymes make a catalytic reaction easier to control, which simplifies the purification process, reduces ecological pollution, can be reused to reduce costs, and is beneficial to industrial production. Multiple enzymes are immobilized on different gauze carriers and multiple enzymes are immobilized on the same carrier separately to form an orderly multi-enzyme complex. The catalytic properties of different enzymes are effectively combined to realize multi-enzyme cascade reactions, thereby greatly improving the catalytic efficiency of enzymes.

In the existing methods, mechanical stirring is used. If the stirring is gentle, the homogeneity cannot be achieved, and the density difference between the dispersed phase and the dispersion medium may lead to uneven deproteinization of the latex; if the stirring is intensified, the high-speed shear and mechanical-impact external force may cause the morphology and structure of the rubber particles to be damaged to varying degrees. However, in the present disclosure, under the premise of reducing the damage to the rubber particles, the immobilized enzyme filter screen is used to achieve isotropic and uniform mixing to the greatest extent to reduce the concentration difference of different microenvironments within the container. The immobilized enzyme filter screen moves up and down in the latex at a uniform speed, and when the rubber particles collide with the mesh, the proteins on the surface of the particles contact the immobilized enzymes. Moreover, the filter screen covers the entire cross-section of the container. During the lifting and dropping circles, each time point of the collision between the rubber particles and the mesh is the time for the contact between the proteins and the high-density enzymes, and enzymolysis and homogenization are conducted simultaneously.

The present disclosure further provides deproteinized natural rubber latex prepared by the preparation method.

The present disclosure further provides the use of the deproteinized natural rubber latex in a natural rubber latex product. In the present disclosure, there is no special limitation on a method of use, and methods well-known in the art can be used.

The technical solutions of the present disclosure will be clearly and completely described below with reference to the examples of the present disclosure. Apparently, the described examples are only a part of, not all of, the examples of the present disclosure. All other examples obtained by a person of ordinary skill in the art based on the examples of the present disclosure without creative efforts shall fall within the protection scope of the present disclosure.

Example 1

Preparation of Adsorption Medium Solution (1) Preparation of regenerated fibroin solution: $CaCl_2$/$CH_3CH_2OH$/$H_2O$ was mixed at a mass ratio of 1:2:8 to obtain a ternary solvent, and degummed raw silk was put into the ternary solvent at a mass ratio of 1:20 (raw silk:

ternary solvent), allowed to stand at 50° C. for 6 h for swelling, and then stirred at 70° C. until the degummed raw silk was completely dissolved. The resulting solution was dialyzed through a semi-permeable membrane dialysis bag with pure water at room temperature, with water changed once every 4 h, and conductivity of dialyzed water was detected until the conductivity was less than or equal to 1.0 $\mu$S/cm. The dialyzed fibroin solution was concentrated with a 10 wt % polyethylene glycol solution to obtain a regenerated fibroin solution with a concentration of 3.6 wt % and a pH value of 7.0.

(2) Preparation of dopamine hydrochloride solution: 1.817 kg of Tris was dissolved in deionized water to obtain a 0.1 M Tris buffer and adjusted to a pH value of 8.0 with hydrochloric acid; 1.0 kg of dopamine was dissolved in the Tris buffer to obtain the dopamine hydrochloride solution with a concentration of 1.9 mg/mL.

(3) Preparation of polyethyleneimine solution: polyethyleneimine was dissolved in deionized water, and acetic acid-sodium hydroxide with a pH value of 5 was used as a buffer to prepare a 1.42 wt % polyethyleneimine solution with a pH value of 8.0.

(4) Preparation of sodium alginate solution: sodium alginate was dissolved in deionized water, and a sodium phosphate buffer with a pH value of 5 was used as a buffer to prepare a 0.11 wt % sodium alginate solution with a pH of 7.0.

(5) Preparation of chitosan solution: chitosan was dissolved in a 1% acetic acid aqueous solution, and sodium acetate with a pH value of 5 was used as a buffer to prepare a 0.21 wt % chitosan solution with a pH of 5.5.

Example 2

Preparation of Enzyme Carrier Gauze

TABLE 1

| | | Woven mesh | | | | |
|---|---|---|---|---|---|---|
| Mesh wire source | Mesh wire material | Mesh wire diameter (mm) | Average breaking strength (MPa) | Elongation rate (%) | Mesh aperture (cm) | Mesh-forming size Length × Width (cm) |
| Commercially available | Pure cotton wire | 2 | 36 | 2.5 | 1.0 | 60 × 60 |
| Commercially available | Silk wire | 0.4 | 27 | 3.1 | 0.5 | 60 × 60 |
| Commercially available | Pineapple fiber wire | 3 | 28 | 2.7 | 1.0 | 60 × 60 |

(1) A woven silk mesh was put into a 70 wt % isopropanol solution, ultrasonically washed for 40 min, then ultrasonically cleaned with deionized water for 20 min to remove the grease and dusts on the surface, taken out, and dried in a vacuum drying oven at 50° C.; a cleaned and dried woven silk mesh was immersed in the regenerated fibroin solution and kept at room temperature for 120 min, taken out, and washed with deionized water until the filtrate became colorless and transparent, and dried in a vacuum oven at 50° C. overnight to obtain a woven silk mesh adsorbed with fibroin; the fibroin solution was replaced with the dopamine hydrochloride solution to obtain a woven silk mesh adsorbed with dopamine hydrochloride.

(2) A woven pure cotton mesh was put into a 70 wt % isopropanol solution, ultrasonically washed for 40 min, then ultrasonically cleaned with deionized water for 20 min to remove the grease and dusts on the surface, taken out, and dried in a vacuum drying oven at 50° C.; a cleaned and dried woven pure cotton mesh was immersed in the dopamine hydrochloride solution and kept at room temperature for 120 min, taken out, and washed with deionized water until the filtrate become colorless and transparent, and dried in a vacuum oven at 50° C. overnight to obtain a woven pure cotton mesh adsorbed with dopamine hydrochloride. The dopamine hydrochloride solution was replaced with the regenerated fibroin solution, the polyethyleneimine solution, the sodium alginate solution, and the chitosan solution separately to obtain corresponding woven pure cotton mesh adsorbed with regenerated fibroin, woven pure cotton mesh adsorbed with polyethyleneimine, woven pure cotton mesh adsorbed with sodium alginate, and woven pure cotton mesh adsorbed with chitosan.

(3) A woven pineapple fiber mesh was put into a 70 wt % isopropanol solution, ultrasonically washed for 40 min, then ultrasonically cleaned with deionized water for 20 min to remove the grease and dust on the surface, taken out, and dried in a vacuum drying oven at 50° C.; a cleaned and dried woven pineapple fiber mesh was immersed in the chitosan solution and kept at room temperature for 120 min, taken out, and washed with deionized water until the filtrate became colorless and transparent, and dried in a vacuum oven at 50° C. overnight to obtain a woven pineapple fiber mesh adsorbed with chitosan.

Example 3

Preparation of Immobilized Enzymes (1) preparation of papain solution: papain was dissolved in a sodium phosphate buffer with a pH value of 5.5 to prepare a papain solution with a concentration of 15.5 mg/mL and a pH value of 9.0;

(2) preparation of an alkaline protease solution: alkaline protease was dissolved in a sodium phosphate buffer with a pH value of 9.5 to prepare an alkaline protease solution with a concentration of 15.5 mg/mL and a pH value of 9.0;

(3) preparation of bromelain solution: bromelain was dissolved in a sodium phosphate buffer with a pH value of 7.5 to prepare a bromelain solution with a concentration of 15.0 mg/mL and a pH value of 9.0;

(4) preparation of trypsin solution: trypsin was dissolved in a sodium phosphate buffer with a pH value of 8.0 to prepare a trypsin solution with a concentration of 16.5 mg/mL and a pH value of 9.0;

(5) preparation of exopeptidase solution: to 12 kg of fresh sheep kidney was added 100 L of water, mashed, and autolyzed at room temperature for 6 h, the obtained autolyzed kidney juice was centrifuged at 5,000 r/min for 20 min, the supernatant was collected and filtered; ammonium sulfate was added to a resulting filtrate to 50% saturation, the precipitates were collected, dissolved in water, and dialyzed and desalted to obtain a compound exopeptidase solution with a concentration of 12.9 mg/mL and a pH value of 7.5; and (6) preparation of compound phospholipase solution and lipase solution: 8 kg of phospholipase A, 8 kg of phospholipase B, and 2 kg of lipase were extracted using 100 L of a glycine-sodium hydroxide buffer with a pH value of 9.5 for 1 h and centrifuged at 2,000 r/min for 30 min to remove impurities. Supernatants were collected as the compound phospholipase solution (8.5 mg/mL, pH=9.0) and the lipase solution (8.9 mg/mL, pH=9.0), respectively, and stored in a refrigerator at 4° C. until later use.

Immobilized Enzymes:

The woven silk mesh adsorbing regenerated fibroin was immersed into the papain solution, shaken at room temperature with a shaker rotational speed of 300 rpm until the solution became clear, and the supernatant was poured. Cross-linking was conducted on the woven silk mesh adsorbing regenerated fibroin and papain with a 3.0 wt % cross-linking agent glutaraldehyde solution at a pH value of 9.0 for 120 min. After the cross-linking was completed, the woven mesh was washed twice using a glycine buffer with a pH value of 6.0, then washed with water until the pH value was stable and dried at room temperature to obtain a woven fibroin mesh with immobilized papain. The supernatant, cross-linked solution, and eluate were collected and mixed, the protein content was determined, and then a loading capacity of the immobilized papain was calculated (according to SN/T 2497.20-2010 *"Test method of import and export dangerous chemicals—Part* 20: *Determination of protein content using Bradford method"*: in an acidic solution, Coomassie Brilliant Blue G250 conjugates with basic amino acids [arginine] and aromatic amino acids in protein molecules to form a blue complex, and its color intensity is proportional to the protein concentration within a certain range. A standard curve was plotted against the protein reference substance solution, and the protein content in the test product is determined by a colorimetric method).

Loading capacity of immobilized enzymes: the amount of protease immobilized per unit mass of woven mesh, unit: mg/g.

Activity of immobilized enzymes: under the experimental conditions, the amount of enzyme consumed to produce 1 μmol product per unit time, is defined as 1 U. For example, protease hydrolyzed a casein substrate under certain temperature and pH conditions, and then reagents such as trichloroacetic acid were added to terminate the enzymatic reaction and precipitate unhydrolyzed casein. The filtrate exhibited absorption of ultraviolet light, which could be measured by ultraviolet spectrophotometry, and the enzyme activity was calculated according to the absorbance.

The immobilized enzyme woven meshes and corresponding parameters are shown in Table 2.

TABLE 2

Immobilized enzyme woven meshes obtained by selecting different enzyme solutions and cross-linking agents (conditions not listed in Table 2 being the same as above)

| ID | Name | Woven mesh | Enzyme solution | Enzyme dosage in enzyme solution | Cross-linking agent | Cross-linking agent dosage | Protein eluent for washing woven mesh (1M) | Loading capacity of immobilized enzyme (activity of immobilized enzyme) |
|---|---|---|---|---|---|---|---|---|
| I | Papain-immobilized fibroin woven silk mesh | Regenerated fibroin-adsorbed woven silk mesh | Papain pH = 9.0, 15.5 g/mL | 1000 mg/g of gauze | Glutaraldehyde, pH = 9.0, 3.0 wt % | 5 g/g | Washing with a glycine buffer at pH = 6.0 twice, then washing with water until the pH value is stable | 192 mg/g of mesh (21 U/g of mesh) |
| II | Alkaline protease-immobilized fibroin woven silk mesh | Fibroin-adsorbed woven silk mesh | Alkaline protease pH = 9.0, 15.5 g/mL | 1000 mg/g of gauze | Glutaraldehyde, pH = 9.5, 3.5 wt % | 5 g/g | Washing with a potassium phosphate buffer at pH = 7.5 twice, then washing with water until the pH value is stable | 205 mg/g of mesh (28 U/g of mesh) |

TABLE 2-continued

Immobilized enzyme woven meshes obtained by selecting different enzyme solutions
and cross-linking agents (conditions not listed in Table 2 being the same as above)

| ID | Name | Woven mesh | Enzyme solution | Enzyme dosage in enzyme solution | Cross-linking agent | Cross-linking agent dosage | Protein eluent for washing woven mesh (1M) | Loading capacity of immobilized enzyme (activity of immobilized enzyme) |
|---|---|---|---|---|---|---|---|---|
| III | Trypsin-immobilized dopamine hydrochloride woven silk mesh | Dopamine hydrochloride-adsorbed woven silk mesh | Trypsin pH = 9.0, 16.5 g/mL | 1000 mg/g of gauze | Glutaraldehyde, pH = 9.0, 3.0 wt % | 5 g/g | Washing with a potassium phosphate buffer at pH = 8.0 twice, then washing with water until the pH value is stable | 240 mg/g of mesh (23 U/g of mesh) |
| IV | Exopeptidase-immobilized dopamine hydrochloride woven silk mesh | Dopamine hydrochloride-adsorbed woven silk mesh | Exopeptidase pH = 7.5, 12.9 g/mL | 1000 mg/g of gauze | Glutaraldehyde, pH = 7.5, 2.5 wt % | 5 g/g | Washing with a potassium phosphate buffer at pH = 7.0 twice, then washing with water until the pH value is stable | 317 mg/g of mesh (32 U/g of mesh) |
| V | Phospholipase and lipase-immobilized fibroin woven pure cotton mesh | Fibroin-adsorbed woven pure cotton mesh | Phospholipases A and B pH = 9.0, 8.5 g/mL Lipase pH = 9.0, 8.9 g/mL | 1000 mg/g of gauze | CaCl₂, pH = 9.0, 0.5 wt % | 5 g/g | Washing with a glycine-sodium hydroxide buffer at pH = 9.0 twice, then washing with water until the pH value is stable | 375 mg/g of mesh (29 U/g of mesh) |
| VI | Exopeptidase-immobilized dopamine hydrochloride woven pure cotton mesh | Dopamine hydrochloride-adsorbed woven pure cotton mesh | Exopeptidase pH = 7.5, 12.9 g/mL | 1000 mg/g of gauze | Glutaraldehyde, pH = 7.5, 3.0 wt % | 5 g/g | Washing with a potassium phosphate buffer at pH=7.0 twice, then washing with water until the pH value is stable | 208 mg/g of mesh (25 U/g of mesh) |
| VII | Trypsin-immobilized polyethyleneimine woven pure cotton mesh | Polyethyleneimine-adsorbed woven pure cotton mesh | Trypsin pH = 9.0, 16.5 g/mL | 1000 mg/g of gauze | Glutaraldehyde, pH = 9.0, 3.0 wt % | 5 g/g | Washing with a potassium phosphate buffer at pH = 8.0 twice, then washing with | 195 mg/g of mesh (19 U/g of mesh) |

TABLE 2-continued

Immobilized enzyme woven meshes obtained by selecting different enzyme solutions
and cross-linking agents (conditions not listed in Table 2 being the same as above)

| ID | Name | Woven mesh | Enzyme solution | Enzyme dosage in enzyme solution | Cross-linking agent | Cross-linking agent dosage | Protein eluent for washing woven mesh (1M) | Loading capacity of immobilized enzyme (activity of immobilized enzyme) |
|---|---|---|---|---|---|---|---|---|
| VIII | Papain-immobilized chitosan woven pure cotton mesh | Chitosan-adsorbed woven pure cotton mesh | Papain pH = 9.0, 15.5 g/mL | 1000 mg/g of gauze | Glutaraldehyde, pH = 9.0, 3.0 wt % | 5 g/g | water until the pH value is stable Washing with a glycine buffer at pH = 6.0 twice, then washing with water until the pH value is stable | 117 mg/g of mesh (12 U/g of mesh) |
| IX | Alkaline protease-immobilized sodium alginate woven pure cotton mesh | Sodium alginate-adsorbed woven pure cotton mesh | Alkaline protease pH = 9.0, 15.5 g/mL | 1000 mg/g of gauze | Glutaraldehyde, pH = 9.5, 3.5 wt % | 5 g/g | Washing with a potassium phosphate buffer at pH = 7.5 twice, then washing with water until the pH value is stable | 109 mg/g of mesh (13 U/g of mesh) |
| X | Bromelain-immobilized chitosan woven pineapple fiber mesh | Chitosan-adsorbed woven pineapple fiber mesh | Bromelain pH = 9.0, 15.5 g/mL | 1000 mg/g of gauze | Glutaraldehyde, pH 7.0, 1.0 wt % | 5 g/g | Washing with a potassium phosphate buffer at pH = 7.0 twice, then washing with water until the pH value is stable | 93 mg/g of mesh (11 U/g of mesh) |

Examples 4 to 16 (Including Examples 4-1 and 4-2)

TABLE 3

Combination sequence of filter screen mesh layers in Example 4

| | |
|---|---|
| I | Papain-immobilized fibroin woven silk mesh |
| II | Alkaline protease-immobilized fibroin woven silk mesh |
| III | Trypsin-immobilized dopamine hydrochloride woven silk mesh |
| IV | Exopeptidase-immobilized dopamine hydrochloride woven silk mesh |
| V | Phospholipase and lipase-immobilized fibroin woven pure cotton mesh |
| VI | Exopeptidase-immobilized dopamine hydrochloride woven pure cotton mesh |
| X | Bromelain-immobilized chitosan woven pineapple fiber mesh |

Figure 2:
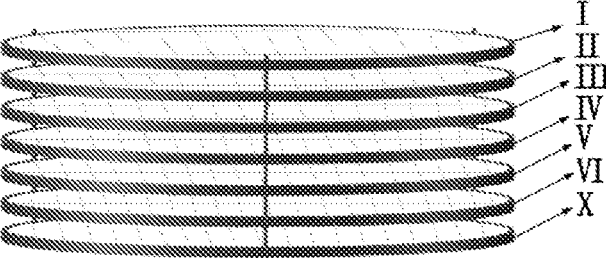
FIG. 2 shows a schematic structural diagram of a combination of multi-layer filter screen in Example 4.
Figure 3:
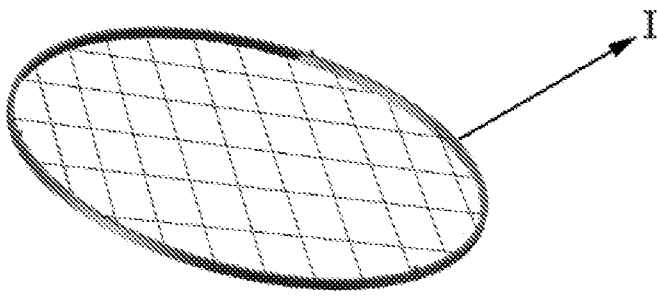
FIG. 3 shows a schematic structural diagram of a single-layer filter screen in Example 4.

(1) As shown in FIG. 1 to FIG. 3, steel bars with a diameter of 0.5 cm were hooped to form a steel ring with a diameter of 30 cm as a frame to fix the filter screens in Table 2 separately; each filter screen was fixed with three vertical axes that were equally divided (an angle between the lines was 120°), forming a multi-layer filter screen with a mesh spacing of 5 cm; and the filter screen was placed in a cylinder with a diameter of 40 cm and a height of 100 cm, and then automatically lifted and dropped by a mechanical device. 40 kg of a commercially available high-ammonia natural rubber latex (obtained from a fresh latex of *Hevea brasiliensis* through centrifugation and concentration, with a dry rubber content of 60 wt %, a total solid content of 61.9 wt %, and a pH value of 12) into the cylinder, deionized water was added to adjust a latex concentration to 25 wt % (for Examples 10 to 12, 83 kg of the fresh latex of *Hevea brasiliensis* was taken with a dry rubber content of 29 wt %, a total solid content of 33 wt %, deionized water was added to adjust a latex concentration to 25 wt %, and then adjusted to a pH value to 11 with ammonia water); 19.2 kg of a nonionic surfactant accounting for 5 wt % of the natural rubber latex was added (referring to Table 4 for specific types, and ratios in Table 4 each were mass ratios), the automatic lifting and dropping of the filter screen was started at a lifting speed of 10 cm/s for 4 h, then allowed to stand for 8 h. The automatic lifting and dropping of the filter screen was restarted at a speed of 10 cm/s for 1 h, and 2.4 kg of a gluconolactone solution was added dropwise at 133 g/min (a concentration of the gluconolactone solution was 6 wt %, and a mass of gluconolactone accounted for 5% of the natural rubber latex); the recirculating filtration was maintained for 6 h, then allowed to stand for 3 h, and the pH value was measured to be 5.0; the filter screen was taken out, washed with deionized water, and dried at room temperature for reuse.

(2) 17 kg of an anionic surfactant potassium laurate and 18.4 kg of a water soluble polymer (polyethylene glycol: methoxy polyethylene glycol=1:1, mass ratio), each accounting for 3 wt % of the natural rubber latex, were added to the latex and adjusted to a pH value of 10 with a 1 wt % KOH solution, a mixture was subjected to mechanical stirring for 3 h, and allowed to stand for 6 h, followed by conducting high-speed centrifugation to obtain the deproteinized natural rubber latex with a purity of not less than 99% (dry rubber content/total solid content).

Performance Testing

1) The mechanical stability of each deproteinized natural rubber latex obtained in Examples 4 to 16 was measured according to a method for measuring the mechanical stability of concentrated natural rubber latex according to standard ISO 35, and the results are shown in Table 4.

2) Determination of protein content by water extraction

The prepared deproteinized natural rubber latex was sampled according to the provisions of ISO 123. A film formation by casting method: a commercially available polypropylene petri dish with an inner diameter of 90 mm was selected; the petri dish was placed horizontally on a horizontal support and a certain amount of the natural rubber latex was poured into the petri dish, spread evenly over a bottom of the petri dish, and air-dried naturally at room temperature until it was transparent. The finished film was peeled off from the bottom of the petri dish, and the thickness of the dry film was 0.3 mm±0.05 mm. The naturally dried latex film was tested for protein content by water extraction according to a method in ASTM D5712, and the results are shown in Table 4.

TABLE 4

| | | | | | | | Protein content by water extraction of depro- teinized natural rubber latex (μg/g) |
|---|---|---|---|---|---|---|---|
| Example | Natural rubber latex raw material, wt % (as dry rubber content) | Mesh combination sequence of filter screen | Nonionic surfactant | Water soluble polymer | Anionic surfactant | Solid content/ mechanical stability of deproteinized natural latex | |
| Example 4 | Commercially available high-ammonia natural rubber latex 60 wt %, diluted with deionized water to 25 wt % | I-II-III-IV-V-VI-X | Tween: glucoside = 1:1 | Polyethylene glycol: methoxy polyethylene glycol = 1:1 | Potassium laurate | 61%/900 s | 21 |
| Example 4-1 | Commercially available high-ammonia natural rubber latex 60 wt %, diluted with deionized water to 25 wt % | The filter screen of Example 4 is reused for the first time after drying | Tween: glucoside = 1:1 | Polyethylene glycol: methoxy polyethylene glycol = 1:1 | Potassium laurate | 62%/900 s | 27 |

Scheme and protein content by water extraction of each latex in Examples 4 to 16 and Comparative Examples 1 to 7

TABLE 4-continued

Scheme and protein content by water extraction of each latex
in Examples 4 to 16 and Comparative Examples 1 to 7

| Example | Natural rubber latex raw material, wt % (as dry rubber content) | Mesh combination sequence of filter screen | Nonionic surfactant | Water soluble polymer | Anionic surfactant | Solid content/ mechanical stability of deproteinized natural latex | Protein content by water extraction of deproteinized natural rubber latex (μg/g) |
|---|---|---|---|---|---|---|---|
| Example 4-2 | Commercially available high-ammonia natural rubber latex 60 wt %, diluted with deionized water to 25 wt % | The filter screen of Example 4 is reused for the second time after drying | Tween: glucoside = 1:1 | Polyethylene glycol: methoxy polyethylene glycol = 1:1 | Potassium laurate | 62%/900 s | 23 |
| Example 5 | Commercially available high-ammonia natural rubber latex 60 wt %, diluted with deionized water to 25 wt % | I-II-III-IV-VI-X | Span: glucoside = 1:1 | Polyethylene glycol: methoxy polyethylene glycol = 1:1 | Potassium laurate | 61.5%/900 s | 50 |
| Example 6 | Commercially available high-ammonia natural rubber latex 60 wt %, diluted with deionized water to 25 wt % | V-VI-VII-VIII-IX-X | Glucoside | Polyethylene glycol: methoxy polyethylene glycol = 1:1 | Potassium laurate | 61%/850 s | 35 |
| Example 7 | Commercially available high-ammonia natural rubber latex 60 wt %, diluted with deionized water to 25 wt % | V-VII-VIII-IX-X | Iso-tridecanol polyoxy-ethylene ether | Polyethylene glycol: methoxy polyethylene glycol = 1:1 | Potassium laurate | 61%/750 s | 65 |
| Example 8 | Commercially available high-ammonia natural rubber latex 60 wt %, diluted with deionized water to 25 wt % | I-II-III-IV-VII-VIII-IX-X | Alkyl poly-glucoside | Polyethylene glycol: methoxy polyethylene glycol = 1:1 | Potassium laurate | 61%/650 s | 71 |
| Example 9 | Commercially available high-ammonia natural rubber latex 60 wt %, | II-IV-V-VII-VIII-IX-X | Alkyl poly-glucoside | Polyethylene glycol: methoxy polyethylene glycol = 1:1 | Potassium laurate | 62% 600 s | 31 |

TABLE 4-continued

Scheme and protein content by water extraction of each latex
in Examples 4 to 16 and Comparative Examples 1 to 7

| Example | Natural rubber latex raw material, wt % (as dry rubber content) | Mesh combination sequence of filter screen | Nonionic surfactant | Water soluble polymer | Anionic surfactant | Solid content/ mechanical stability of deproteinized natural latex | Protein content by water extrac- tion of depro- teinized natural rubber latex (µg/g) |
|---|---|---|---|---|---|---|---|
| Example 10 | diluted with deionized water to 25 wt % Fresh natural rubber latex 29 wt %, diluted with deionized water to 25 wt % | II-VII-VIII-IX-X | Tween: Span = 1:1 | Polyethylene glycol: methoxy polyethylene glycol = 1:1 | Potassium laurate | 61.5%/500 s | 145 |
| Example 11 | Fresh natural rubber latex 29 wt %, diluted with deionized water to 25 wt % | I-I-I-I-I | Tween: Span = 1:1 | Polyethylene glycol: methoxy polyethylene glycol = 1:1 | Potassium laurate | 62% 600 s | 181 |
| Example 12 | Fresh natural rubber latex 29 wt %, diluted with deionized water to 25 wt % | II-II-II-II-II- | Iso- tridecanol polyoxy- ethylene ether | Polyethylene glycol: methoxy polyethylene glycol = 1:1 | Potassium laurate | 61%/650 s | 158 |
| Example 13 | Commercially available high-ammonia natural rubber latex 60 wt %, diluted with deionized water to 25 wt % | III-III-III-III-III- | Tween: Span = 1:1 | Polyethylene glycol: methoxy polyethylene glycol = 1:1 | Potassium laurate | 61%/700 s | 165 |
| Example 14 | Commercially available high-ammonia natural rubber latex 60 wt %, diluted with deionized water to 25 wt % | IV-IV-IV-IV-IV- | Tween: Span = 1:1 | Polyethylene glycol: methoxy polyethylene glycol = 1:1 | Potassium laurate | 61%/750 s | 275 |
| Example 15 | Commercially available high-ammonia natural rubber latex 60 wt %, diluted with deionized water to 25 wt % | V-V-V-V-V- | Tween: Span = 1:1 | Polyethylene glycol: methoxy polyethylene glycol = 1:1 | Potassium laurate | 61%/850 s | 410 |

TABLE 4-continued

Scheme and protein content by water extraction of each latex
in Examples 4 to 16 and Comparative Examples 1 to 7

| Example | Natural rubber latex raw material, wt % (as dry rubber content) | Mesh combination sequence of filter screen | Nonionic surfactant | Water soluble polymer | Anionic surfactant | Solid content/ mechanical stability of deproteinized natural latex | Protein content by water extrac- tion of depro- teinized natural rubber latex (μg/g) |
|---|---|---|---|---|---|---|---|
| Example 16 | Commercially available high-ammonia natural rubber latex 60 wt %, diluted with deionized water to 25 wt % | X-X-X-X-X- | Tween: Span = 1:1 | Polyethylene glycol: methoxy polyethylene glycol = 1:1 | Potassium laurate | 61%/650 s | 135 |
| Compar- ative Example 1 | Commercially available high-ammonia natural rubber latex 60 wt %, diluted with deionized water to 25 wt % | Blank | Tween: Span = 1:1 | Polyethylene glycol: methoxy polyethylene glycol = 1:1 | Potassium laurate | 61%/1000 s | 580 |
| Compar- ative Example 2 | Commercially available high-ammonia natural rubber latex 60 wt %, diluted with deionized water to 25 wt % | Free papain (0.1%) | Tween: Span = 1:1 | Polyethylene glycol: methoxy polyethylene glycol = 1:1 | Potassium laurate | 61%/1000 s | 340 |
| Compar- ative Example 3 | Rubber latex 60 wt % obtained in Comparative Example 2, diluted with deionized water to 25 wt % | Free exopeptidase (0.15%), phospholipase (0.15%), and lipase (0.2%) | Tween: Span = 1:1 | Polyethylene glycol: methoxy polyethylene glycol = 1:1 | Potassium laurate | 61%/900 s | 210 |
| Compar- ative Example 4 | Rubber latex 60 wt % obtained in Comparative Example 3, diluted with deionized water to 25 wt % | Blank | Tween: Span = 1:1 | Polyethylene glycol: methoxy polyethylene glycol = 1:1 | Potassium laurate | 61%/700 s | 96 |
| Compar- ative Example 5 | Commercially available high-ammonia natural rubber latex 60 wt %, diluted with deionized water to 25 wt % | Free alkaline protease (0.2%) | Tween: Span = 1:1 | Polyethylene glycol: methoxy polyethylene glycol = 1:1 | Potassium laurate | 61%/1050 s | 290 |

TABLE 4-continued

Scheme and protein content by water extraction of each latex
in Examples 4 to 16 and Comparative Examples 1 to 7

| Example | Natural rubber latex raw material, wt % (as dry rubber content) | Mesh combination sequence of filter screen | Nonionic surfactant | Water soluble polymer | Anionic surfactant | Solid content/ mechanical stability of deproteinized natural latex | Protein content by water extraction of deproteinized natural rubber latex (μg/g) |
|---|---|---|---|---|---|---|---|
| Compar- ative 6 | Rubber latex 60 wt % obtained in Comparative Example 5, diluted with deionized water to 25 wt % | Free exopeptidase (0.15%), phospholipase (0.15%), and lipase (0.2%) | Tween: Span = 1:1 | Polyethylene glycol: methoxy polyethylene glycol = 1:1 | Potassium laurate | 61%/900 s | 190 |
| Compar- ative Example 7 | Rubber latex 60 wt % obtained in Comparative Example 6, diluted with deionized water to 25 wt % | Blank | Tween: Span = 1:1 | Polyethylene glycol: methoxy polyethylene glycol = 1:1 | Potassium laurate | 61%/700 s | 87 |

Generally, the more runs the centrifugation is conducted, the greater the damage is done to the latex. As shown in Table 4, only under the premise of centrifugation once, the protease immobilized mesh, peptidase immobilized mesh, and phospholipase and lipase immobilized mesh existed simultaneously to form a multi-layer mesh, and could remove proteins to the best extent, as Examples 4, 6, and 9; moreover, they still maintained relatively high activity and original protein-removing ability after repeated use, such as Examples 4-1 and 4-2. In contrast, the protein-removing ability of the multilayer mesh lacking phospholipase and lipase mesh or the multilayer mesh lacking peptidase mesh was slightly weaker, such as Examples 5, 7, and 8; and the multilayer mesh that only contained a kind of protease had a weaker ability to remove proteins, as Examples 11, 12, 13, and 16; the multilayer mesh containing only peptidase or only phospholipase and lipase was least capable of removing proteins, such as Examples 14 and 15. In the comparative example, for the same enzyme, the protein-removing ability of the free enzyme was far weaker than that of the multilayer mesh composed of protease immobilized mesh, peptidase immobilized mesh, and phospholipase and lipase immobilized mesh, and then even weaker than that of the multilayer mesh containing only one protease. Adding different free enzymes step by step and centrifuging multiple times could improve the protein-removing ability, but the effect could not reach the multilayer mesh composed of protease-immobilized mesh, peptidase-immobilized mesh, and phospholipase and lipase-immobilized mesh. More importantly, the latex particles were disrupted to a greater extent.

Application Example

Prevulcanization of deproteinized natural rubber latex and preparation of gloves:

15 parts by weight of a 10% potassium hydroxide aqueous solution were weighed; 40.5 parts by weight of ZDC, 13.5 parts by weight of PX, 90 parts of by weight sulfur, 67.5 parts by weight of zinc oxide, 90 parts by weight of an anti-aging agent Wingstay L, 11.5 parts by weight of cetylt-rimethylammonium bromide, 2 parts by weight of nano calcium carbonate, 0.1 part by weight of Tween-40, 0.1 part of by weight Span-80, and deionized water were mixed and ground for 6 h to prepare a mixed vulcanizing agent suspension with a mass fraction of 50%.

15,000 parts by weight of each deproteinized natural rubber latex in Examples 4 to 16 and Comparative Examples 1 to 7 were added to a vulcanization reactor with a jacket; 5,000 parts by weight of deionized water, 15 parts by weight of a 10% potassium hydroxide aqueous solution, and 626 parts by weight of 50% mixed vulcanizing agent suspension were added in the reactor and stirred evenly, the deproteinized natural rubber latex was heated in a water bath to 50° C. and vulcanized for 60 min, and then cooled down to 45° C. and vulcanized for 4 h, and allowed to stand at 30° C. for 2 d to 5 d. The chloroform value was detected continuously, and when the degree of vulcanization represented by the chloroform value of the deproteinized natural rubber latex reached a middle stage of three grade+, pre-vulcanized deproteinized natural rubber latex was obtained. The pre-vulcanized deproteinized natural rubber latex was diluted with deionized water to a total solid mass fraction of 40%, and the chloroform value was detected continuously for three consecutive days to maintain at the middle stage of third grade+ to an early stage of the fourth grade –.

1) According to a conventional glove-forming dipping process, a hand mold was heated to 70° C. and then immersed in a coagulation solution (obtained by heating and stirring 42 g of calcium nitrate, 4.5 g of calcium carbonate, 0.8 g of a wetting agent, 4.5 g of a mold release agent, and 500 g of water to 95° C., and cooling to a room temperature naturally), took out after standing for 20 seconds, and dried at 110° C. for 5 min. The dried hand mold was cooled to 60° C., immersed in the deproteinized natural rubber latex for 20 seconds, and vulcanized and dried at 100° C. for 10 minutes. The hand mold was cooled to 50° C. and immersed in a polyurethane emulsion for 12 seconds. The hand mold was heated at 80° C. for 18 min, cleaned and demolded to obtain deproteinized natural rubber latex gloves. The physical properties of gloves were measured according to GB 7543-2020/ISO 10282:2014 and GB/T 21869-2008/ISO 21171:2006, and the results are shown in Table 5.

Meanwhile, the glove had the highest percentage of elongation at break indicating softness and elasticity, and no defects such as pinholes or cracks. In contrast, the ability of other combined multilayer meshes to remove proteins was weakened accordingly, that is, the protein content by water extraction in the latex increased, the 300% constant elongation load of the corresponding glove increased, and the elongation at break % decreased. In the comparative examples, most of the water extractable proteins could be through several runs of centrifugation by using free enzymes, but the latex particles were destroyed. Although the 300% constant elongation load of the corresponding gloves was small, the percentage of the elongation at break decreased, and water leakage existed, indicating that the gloves had defects such as pinholes or cracks, that was, the latex had a poor film-forming property.

TABLE 5

| | Physical properties of 13 deproteinized natural rubber latex gloves | | | | | |
| | Before aging | | | After aging | | Water |
| Example | Breaking tenacity N | Elongation at break % | 300% constant elongation load % | Breaking tenacity N | Elongation at break % | unpermea-bility |
| --- | --- | --- | --- | --- | --- | --- |
| Example 4 | 10.6-14.0 | 900-1050 | 0.4-0.7 | 11.0-14.6 | 850-990 | Waterproof |
| Example 4-1 | 10.1-14.2 | 910-1030 | 0.4-0.6 | 11.2-15.1 | 840-970 | Waterproof |
| Example 4-2 | 10.9-14.7 | 910-1060 | 0.4-0.7 | 11.2-14.9 | 830-970 | Waterproof |
| Example 5 | 10.8-14.5 | 870-990 | 0.6-0.8 | 11.3-14.5 | 830-930 | Waterproof |
| Example 6 | 10.8-14.3 | 880-1000 | 0.5-0.7 | 11.4-14.6 | 840-950 | Waterproof |
| Example 7 | 11.0-14.9 | 850-980 | 0.5-0.9 | 11.5-15.5 | 790-900 | Waterproof |
| Example 8 | 11.6-15.0 | 850-970 | 0.7-1.0 | 11.8-15.6 | 720-880 | Waterproof |
| Example 9 | 11.2-14.9 | 830-960 | 0.7-1.1 | 11.5-15.7 | 710-850 | Waterproof |
| Example 10 | 11.8-15.7 | 810-890 | 1.0-1.3 | 12.1-15.9 | 710-780 | Waterproof |
| Example 11 | 12.0-15.8 | 790-870 | 1.1-1.3 | 12.1-15.9 | 700-770 | Waterproof |
| Example 12 | 11.8-15.6 | 790-910 | 1.1-1.4 | 12.2-16.0 | 710-790 | Waterproof |
| Example 13 | 11.3-15.1 | 800-880 | 1.0-1.4 | 11.9-15.5 | 720-790 | Waterproof |
| Example 14 | 12.6 -15.9 | 750-840 | 1.1-1.5 | 12.7-16.3 | 700-810 | Waterproof |
| Example 15 | 12.5-15.3 | 750-850 | 1.1-1.5 | 12.9-15.6 | 710-800 | Waterproof |
| Example 16 | 11.5-15.2 | 810-880 | 1.0-1.3 | 11.9-15.8 | 720-790 | Waterproof |
| Comparative Example 1 | 12.9-16.6 | 750-800 | 1.4-1.7 | 13.2-17.1 | 680-750 | Waterproof |
| Comparative Example 2 | 10.1-13.3 | 790-850 | 1.1-1.5 | 10.8-15.3 | 730-800 | Waterproof |
| Comparative Example 3 | 8.7-10.1 | 730-790 | 1.0-1.1 | 8.9-10.5 | 690-750 | 2 with water leakage |
| Comparative Example 4 | 4.1-6.5 | 400-560 | 0.7-0.9 | 5.2-8.0 | 330-550 | 6 with water leakage |
| Comparative Example 5 | 12.1-15.3 | 800-880 | 1.0-1.2 | 12.2-15.9 | 770-860 | Waterproof |
| Comparative Example 6 | 8.8 -10.1 | 710-800 | 0.9-1.1 | 9.1-10.6 | 630-750 | 3 with water leakage |
| Comparative Example 7 | 4.0-5.9 | 390-510 | 0.7-0.9 | 5.1-7.7 | 350-510 | 7 with water leakage |

Notes: the gloves listed in Table 5 were made of the materials in the examples and 13 pieces were taken from each glove, with a size range of 7.0 (width 89 mm±5 mm; length ≥270 mm; single-layer thickness ≥0.11 mm), and protein content by water extraction was tested to be less than 11 µg/g according to the standard.

As shown in Table 5, the law of physical property variation was consistent with the results in Table 3. The multilayer mesh composed of protease-immobilized mesh, peptidase-immobilized mesh, and phospholipase plus lipase-immobilized mesh had the best protein removal effect. That is, the deproteinized rubber latex gloves had a minimum 300% constant elongation load, showing that the gloves were soft and close to the skin, loose and not tight.

2) Evaluation of film-forming properties of deproteinized natural rubber latex

Each pre-vulcanized latex obtained in the different examples was immersed in a glass test tube with a diameter of 5 cm and preheated at 50° C. for 5 seconds, and a mold was lifted at 750 mm/min, the latex became dried on the surface of the mold to form a rubber film. The mold was preheated to 50° C., immersed in the compounded latex for 5 seconds, and pulled out at 1,600 mm/min. After pulling out, a rubber film on the surface of the model was vulcanized at 100° C. for 30 min to obtain a rubber film with a thickness of 0.1 mm. The evaluation was conducted by measuring the thickness (mm) of the rubber film formed on the surface of the model and visually observing the liquid unevenness and the uniformity of the film.

The evaluation criteria for uniform liquid distribution were as follows:

A: absolutely no liquid unevenness was observed;

B: a small amount of liquid unevenness was observed;

C: obvious liquid unevenness was observed.

The evaluation criteria for the thickness uniformity of the film were as follows:

A: the thickness of the film was roughly uniform;

B: the thickness of the film was somewhat uneven, without affecting practical use;

C: obvious the unevenness of the film thickness was observed.

Results are shown in Table 6.

TABLE 6

Evaluation of film-forming properties of deproteinized natural rubber latex

| | Lifting speed at 750 mm/min | | | Lifting speed at 1600 mm/min | | |
|---|---|---|---|---|---|---|
| Example | Film thickness (mm) | Liquid unevenness | Film uniformity | Film thickness (mm) | Liquid unevenness | Film uniformity |
| Example 4 | 0.09 | A | A | 0.16 | A | A |
| Example 4-1 | 0.09 | A | A | 0.15 | A | A |
| Example 4-2 | 0.09 | A | A | 0.15 | A | A |
| Example 5 | 0.09 | A | A | 0.15 | A | A |
| Example 6 | 0.09 | A | A | 0.15 | A | A |
| Example 7 | 0.09 | A | A | 0.15 | A | A |
| Example 8 | 0.09 | A | A | 0.15 | A | A |
| Example 9 | 0.09 | A | A | 0.15 | A | A |
| Example 10 | 0.08 | A | A | 0.14 | B | B |
| Example 11 | 0.08 | A | A | 0.14 | B | B |
| Example 12 | 0.08 | A | A | 0.14 | B | C |
| Example 13 | 0.08 | A | A | 0.14 | B | B |
| Example 14 | 0.07 | A | A | 0.13 | B | C |
| Example 15 | 0.06 | A | A | 0.12 | B | C |
| Example 16 | 0.08 | A | A | 0.14 | B | B |
| Comparative Example 1 | 0.06 | A | A | 0.12 | B | B |
| Comparative Example 2 | 0.07 | A | A | 0.13 | B | B |
| Comparative Example 3 | 0.07 | C | C | 0.13 | C | C |
| Comparative Example 4 | 0.08 | C | C | 0.14 | C | C |
| Comparative Example 5 | 0.08 | A | A | 0.14 | B | B |
| Comparative Example 6 | 0.08 | B | C | 0.14 | C | C |
| Comparative Example 7 | 0.09 | C | C | 0.15 | C | C |

It was seen from Table 6 that the latex with less protein content by water extraction and after one centrifugation had more uniform liquid distribution and better film uniformity. In contrast, the latex with slightly higher protein content by water extraction and after one run of centrifugation had somewhat instability in liquid distribution and film uniformity. For the latex that was conducted for several runs of centrifugation, the liquid distribution and film uniformity were extremely poor, which were difficult to be impregnated to produce film-forming products, such as gloves and condoms.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A method for preparing a deproteinized natural rubber latex, comprising:

compounding mesh gauze with an adsorption medium solution, and conducting adsorption to obtain enzyme carrier gauze;

immersing the enzyme carrier gauze in four solutions, each containing one of four different enzymes, respectively, to conduct enzyme adsorption; conducting cross-linking immobilization on each treated gauze in a cross-linking agent solution to obtain mono-layer immobilized enzyme filter sheets corresponding to each of the four different enzymes; and laminating the mono-layer immobilized enzyme filter sheets corresponding to each of the four different enzymes to obtain an immobilized enzyme filter screen; wherein the four different enzymes are selected from the group consisting of protease, peptidase, phospholipase, and lipase;

mixing natural rubber latex, water, and nonionic surfactant, adding a gluconolactone solution to a resulting mixture, and conducting recirculating filtration on a resulting mixed solution by lifting and dropping the immobilized enzyme filter screen until a pH value is 3 to 6 to obtain a post-enzymolysis latex; and mixing the post-enzymolysis latex, a water-soluble polymer, and an anionic surfactant, adjusting a resulting mixture to a pH value of 9 to 11, conducting solubilization, and conducting centrifugal separation to obtain the deproteinized natural rubber latex.

2. The method of claim 1, wherein the mesh gauze is woven with one or more materials selected from a group consisting of silk braided wire, pure cotton braided wire, and pineapple fiber yarn, and the mesh gauze has a mesh pore size of 0.1 cm to 2.0 cm, a braided wire strength of greater than 25 MPa, and an elongation rate of less than 20%;

the adsorption medium solution is one or more selected from a group consisting of a regenerated silk fibroin solution, a polyethyleneimine solution, a dopamine hydrochloride solution, a sodium alginate solution, and a chitosan solution; and the adsorption is conducted at 0° C. to 45° C. for 10 min to 300 min.

3. The method of claim 1, wherein the protease is one or more selected from a group consisting of alkaline protease, neutral protease, bromelain, papain, trypsin, thermolysin, staphylococcal protease, and clostripain;

the peptidase is one or more selected from a group consisting of exopeptidase, aminopeptidase, and carboxypeptidase; and the phospholipase is one or more selected from a group consisting of phospholipase A, phospholipase B, phospholipase C, and phospholipase D.

4. The method of claim 1, wherein a cross-linking agent in the cross-linking agent solution is one or more selected from a group consisting of: glutaraldehyde, glyoxal, terephthalaldehyde, and genipin;

the cross-linking agent solution has a concentration of 0.05 wt % to 3.5 wt %, a pH value of 7.0 to 9.5, and a dosage of 3 g/g mesh gauze to 10 g/g mesh gauze; and the enzyme adsorption and the cross-linking immobilization each are conducted independently at 0° C. to 45° C. for 10 min to 300 min.

5. The method of claim 1, wherein the deproteinized natural rubber latex has a dry rubber content of 1.0% to 65% by mass and a pH value of 8.0 to 12.0.

6. The method of claim 1, wherein the nonionic surfactant is any one or more selected from a group consisting of: Tween, Span, trehalose, stachyose, glucoside, nonylphenol polyoxyethylene ether (NPE), iso-tridecanol polyoxyethylene ether, and alkyl polyglucoside, and the nonionic surfactant has a weight percent of 0.01% to 10% of the natural rubber latex;

the gluconolactone solution has a concentration of 1 wt % to 10 wt %, and gluconolactone in the gluconolactone solution has a weight percent of 0.01% to 10% of the deproteinized natural rubber latex.

7. The method of claim 1, wherein when the recirculating filtration is conducted, the immobilized enzyme filter screen is automatically lifted and dropped at a lifting speed of 1 cm/s to 20 cm/s for 3 h to 6 h when a vertical axis is fixed; and after the recirculating filtration is completed, a filtrate is allowed to stand for 3 h or longer.

8. The method of claim 1, wherein the water soluble polymer is one or more selected from a group consisting of: polyethylene glycol, methoxy polyethylene glycol, polypropylene glycol, methyl polypropylene glycol, polyethylene oxide, polyethylene oxide ether, polyvinyl alcohol, a polyvinyl alcohol copolymer, ethyl hydroxyethyl cellulose, methyl cellulose, polyacrylamide, a polyacrylamide copolymer, polyacrylic acid, sodium polyacrylate, polypropylene oxide, and polyglycerol-glycidyl ether-polyvinyl alcohol, and the water soluble polymer has a weight percent of 0.01% to 10% of the deproteinized natural rubber latex;

the anionic surfactant is one or more selected from a group consisting of: diphenyl ether sulfonate, alkylbenzene sulfonate, alkylnaphthalene sulfonate, naphthalene sulfonate, alkyl sulfonate, dialkyl sulfosuccinate, a-alkene sulfonate, a-sulfonated fatty acid salt, alkyl sulfate, polyoxyalkylene stilbene phenol sulfate, polyoxyalkylene sulfonate, triphenylethylene phenol sulfate, polyoxyalkylene phenyl ether sulfate, alkyl sulfate, polyoxyalkylene alkyl sulfate, polyoxyalkylene alkylphenyl ether sulfate, polyoxyalkylene tristyrenated phenol sulfate, and polyoxyalkylene distyrenated phenol sulfate;

the anionic surfactant has a weight percent of 0.01% to 10% of a dry rubber content of the deproteinized natural rubber latex; and the solubilization is conducted for 3 h to 6 h.

* * * * *